US012337233B2

United States Patent
Benedetto et al.

(10) Patent No.: US 12,337,233 B2
(45) Date of Patent: Jun. 24, 2025

(54) BIFURCATION OF GAMEPLAY BETWEEN MOBILE AND NON-MOBILE PLAY WITH INTELLIGENT GAME STATE SAVING, AND STARTUPS

(71) Applicant: Sony Interactive Entertainment Inc., Tokyo (JP)

(72) Inventors: Warren M Benedetto, Foothill Ranch, CA (US); Alvin Daniel, San Mateo, CA (US); Daniel Hiatt, San Mateo, CA (US); Jon Webb, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 18/522,091

(22) Filed: Nov. 28, 2023

(65) Prior Publication Data

US 2024/0100424 A1 Mar. 28, 2024

Related U.S. Application Data

(62) Division of application No. 17/494,246, filed on Oct. 5, 2021, now Pat. No. 11,826,644.

(51) Int. Cl.
*A63F 13/493* (2014.01)
*A63F 13/355* (2014.01)

(52) U.S. Cl.
CPC .......... *A63F 13/493* (2014.09); *A63F 13/355* (2014.09); *A63F 2300/538* (2013.01); *A63F 2300/636* (2013.01)

(58) Field of Classification Search
CPC .................. A63F 13/493; A63F 13/355; A63F 2300/538; A63F 2300/636
See application file for complete search history.

(56) References Cited

U.S. PATENT DOCUMENTS

2017/0358137 A1* 12/2017 Auten ...................... H04L 67/12
2019/0272560 A1* 9/2019 Shin .......................... G06N 3/08
(Continued)

FOREIGN PATENT DOCUMENTS

JP          3983789 B1      7/2007
WO       2019195169 A1    10/2019

OTHER PUBLICATIONS

"Apex I Will Explain the Surprising Specifications of Aim Assist! Let's Understand It Well and Make the Most of It", Available Online at http://web.archive.org/web/20211001125919/https://nukodou.com/apex-aim-assist/#index_id1>, Oct. 1, 2021, 12 pages (relevancy explained in document 4).

(Continued)

*Primary Examiner* — William H McCulloch, Jr.
*Assistant Examiner* — Ankit B Doshi
(74) *Attorney, Agent, or Firm* — Kilpatrick Townsend & Stockton LLP

(57) ABSTRACT

Methods and systems are provided for streaming gameplay to user devices from a cloud gaming system. The cloud gaming system includes a server. The method includes identifying, by the server, a device of a user for playing a game. The method includes identifying, by the server, a bandwidth associated with the device of the user while the user plays the game. The method includes generating, by the server, a video stream to be transmitted to the device. The method further includes dynamically removing, by the server, one or more graphic layers of the video stream before being transmitted to the device.

8 Claims, 6 Drawing Sheets

(56) References Cited

U.S. PATENT DOCUMENTS

2020/0103894 A1* 4/2020 Cella .................. G05B 23/0289
2020/0353363 A1* 11/2020 Slovak ................. A63F 13/355
2021/0129017 A1* 5/2021 White .................... A63F 13/44
2024/0388728 A1* 11/2024 Xie ....................... H04N 19/30

OTHER PUBLICATIONS

Japanese Application No. JP2024-520954, Office Action, Mailed on Feb. 4, 2025, 10 pages.

* cited by examiner

BIFURCATION OF GAMEPLAY BETWEEN MOBILE AND NON-MOBILE PLAY WITH INTELLIGENT GAME STATE SAVING, AND STARTUPS

CLAIM OF PRIORITY

This application is a divisional of U.S. application Ser. No. 17/494,246 filed on Oct. 5, 2021, now U.S. Pat. No. 11,826,644, issued Nov. 28, 2023, entitled "BIFURCATION OF GAMEPLAY BETWEEN MOBILE AND NON-MOBILE PLAY WITH INTELLIGENT GAME STATE SAVING, AND STARTUPS," the disclosure of which is incorporated herein by reference in its entirety for all purposes.

BACKGROUND

1. Field of the Disclosure

The present disclosure relates generally to games played via a mobile device, and more particularly to methods and systems for processing operations of the game to enable an increase in accuracy of controller input from the mobile device, intelligent interruption handling and game state saving, and dynamic streaming gameplay to user devices from a cloud gaming system.

2. Description of the Related Art

Mobile gaming technology has seen many changes over the years and is expected to continue to grow and attract new gamers across a broader audience. With the advancement in smartphones, tablets, and mobile gaming platforms, gamers are provided with an improved and comprehensive gaming experience than previously offered in previous years. Mobile gaming can reach a larger audience since it can easily be accessible and it does not require users to purchase a gaming console or personal computer (PC) to play video games. In contrast to traditional gaming means where a video game runs locally on the player's gaming console or PC, mobile gaming can be accessed via mobile gaming platforms and an array of portable devices.

For example, mobile games can be played via mobile gaming platforms such as PlayStation Vita, Sony PlayStation Portable (PSP), PSP Go. Additionally, other devices whose main function is other than playing games can also provide mobile gaming functionality, such as cell phones, Personal Digital Assistants (PDA), MP3 players, etc. Unfortunately, mobile gaming platforms and portable devices may not offer the same gaming experience that is offered via traditional gaming means such as a gaming console or PC. For example, the fidelity of game control available from touch input of a cellular phone may be less dynamic compared to input buttons via a game controller of a gaming console. Additionally, games played via a portable device such as a cellular phone mobile device can be interrupted by various operations associated with the cellular phone. Also, streaming gameplay to some portable devices may not be configured to accommodate a video stream that includes high-density graphics with multiple graphic layers.

It is in this context that implementations of the disclosure arise.

SUMMARY

Implementations of the present disclosure include methods, systems, and devices relating to playing a game using a mobile device. In some embodiments, methods are disclosed to enable processing operations of a game played via the mobile device to help increase an accuracy of the controller input from the mobile device when performing an action in the game. For example, a user may be playing a shooting game via their mobile device. When using the glass screen of the mobile device to provide controller input to perform an action in the game (e.g., aiming at enemy character), the system is configured to determine and apply a correction value to the controller input to assist the user increase their accuracy when performing the game action (e.g., automatic aim-assist). Since the system monitors the controller inputs of the user during their gameplay, the methods disclosed herein outline ways of applying a correction value to the controller inputs to assist the user in performing various actions in the game, e.g., assist user in aiming accuracy, assist user in controlling and maneuvering a race car, etc.

Thus, as a user plays a game via a mobile device and provides controller input to perform an action in the game, a correction value is determined and applied to the controller input in substantial real-time during the gameplay to assist the user perform the action in the game. In this way, the system can automatically and continuously apply the correction value to the controller input made by the user via the glass screen of the mobile device so that controller input would parallel the input that would have been made on a game controller of a gaming console. Accordingly, when a user plays a game on a mobile device, the user would have a similar experience controlling and interacting with the game as the user would have if playing on a gaming console. In other embodiments, when playing a game via the mobile device, the system is configured to identify interruptions of the gameplay and automatically generate a save point which can be used to resume the gameplay at any point in time. In another embodiment, the system is configured to stream the gameplay to the user's device (or spectators) from a cloud gaming system where one or more graphic layers of a video stream is removed prior to being transmitted to the user's device. In this way, the system can custom assemble layers of content for display on the device of a user based on the available bandwidth and the device type of the user.

In one embodiment, a method for processing operations of a game to be played via a mobile device is provided. The method includes establishing a connection with the mobile device to play the game. The method includes receiving controller input from the mobile device; the controller input being from the mobile device to perform an action in the game. The method includes determining a correction value required to perform the action. The method includes applying the correction value to the controller input to increase an accuracy of the controller input when performing the action. In this way, when correction values are applied to the controller input from the mobile device of a user playing a game, the accuracy of the control input is increased so that the user can achieve the intended action in the game.

In another embodiment, a computer-implemented method is provided. The method includes monitoring, by a computing system, gameplay of a user playing a game via a mobile device. The method includes detecting, by the computing system, an interruption of the gameplay of the user. The method includes processing, by the computing system, metadata associated with the interruption to identify a type of said interruption. The method includes generating, by the computing system, a save point in response to the type of interruption. In one embodiment, the save point is used to resume the gameplay.

In another embodiment, a computer-implemented method is provided. The method includes identifying, by the server, a device of a user for playing a game. The method includes identifying, by the server, a bandwidth associated with the device of the user while the user plays the game. The method includes generating, by the server, a video stream to be transmitted to the device. The method includes dynamically removing, by the server, one or more graphic layers of the video stream before being transmitted to the device.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which.

DETAILED DESCRIPTION

Figure 1:
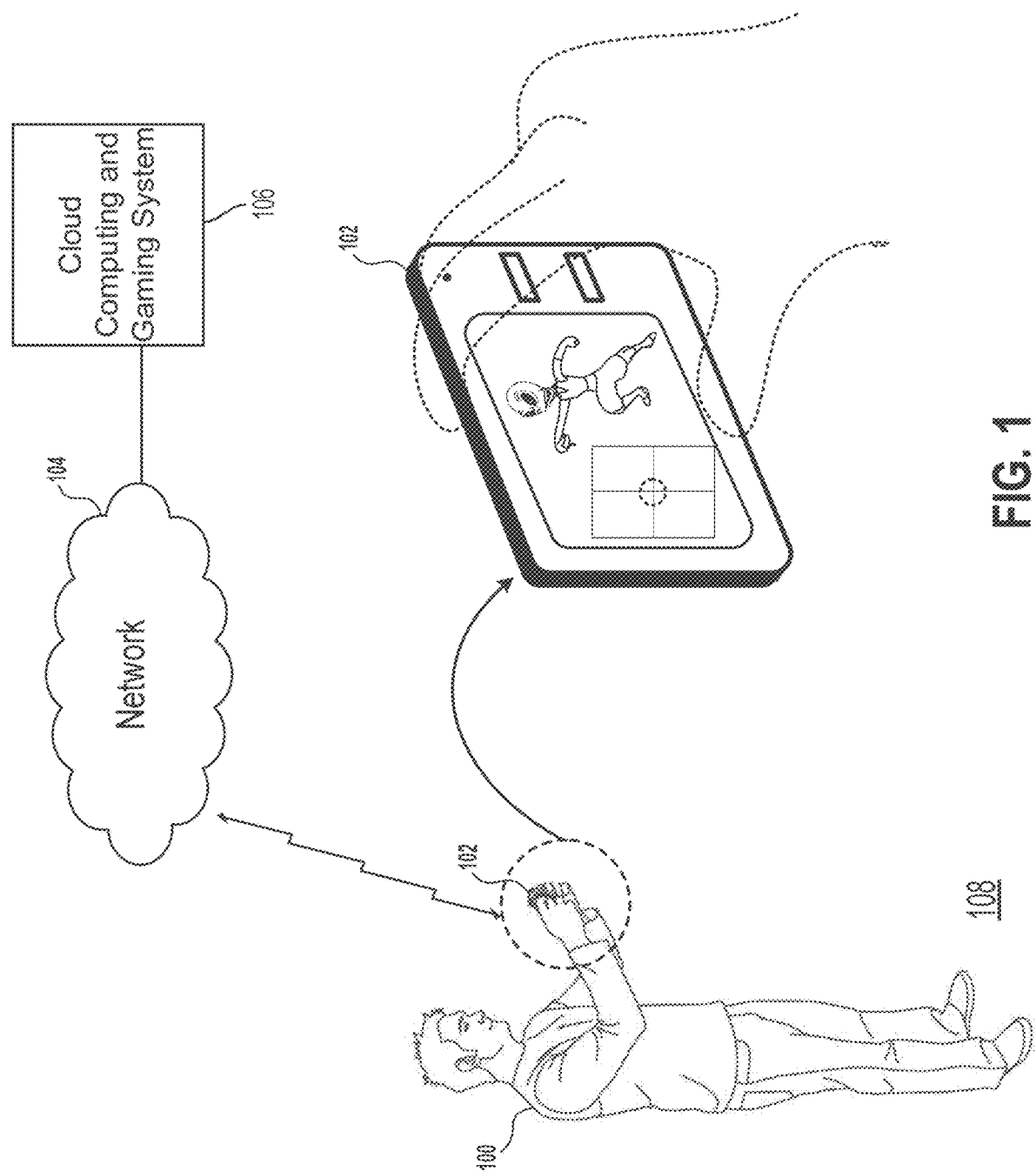
FIG. 1 illustrates an embodiment of a system for interaction of a mobile game via a mobile device, in accordance with an implementation of the disclosure.

The following implementations of the present disclosure provide methods, systems, and devices for playing a game using a mobile device. In some embodiments, methods are disclosed to enable various processing operations such as increasing an accuracy of controller input from the mobile device, intelligent interruption handling and game state saving, and dynamic streaming gameplay with customized graphic layers to user devices from a cloud gaming system.

For example, while a user is playing a shooting game via a mobile device, the system is configured to receive the controller inputs from the mobile device. When the user attempts to use the glass screen of the mobile device to provide controller input to aim at an enemy character in the game, the system is configured to determine and apply a correction value to the controller input to assist the user accurately aim at the enemy character. In this way, the controller input via the mobile device would parallel or be an improvement to controller inputs made through a traditional gaming means (e.g., gaming console, PC, etc.). Accordingly, assisting the mobile device user by applying a correction value to the controller input to perform an action in the game enables an enhanced and improved mobile gaming experience. In turn, this may attract gamers to mobile gaming who traditionally would prefer to play games via a gaming console or a PC.

In another embodiment, when the user plays a game via a mobile device, the system is configured to handle interruptions associated with the mobile device, e.g., phone calls, text messages, low-battery life, etc. In one example, during the gameplay of the user, when the user receives a phone call during the gameplay, the system is configured go generate a save point in response to the interruption which can be used to resume the gameplay. In this way, when users are interrupted during their gameplay, the user can seamlessly resume the gameplay using the save point at any desired time. Interruptions could also be user generated, for example the user decides to initiate a phone call, text message or other activity during gameplay.

In one embodiment, "saving" may be accomplished in several ways. One way may include having the game triggered to write status to disk, non-volatile memory, storage, or network storage, or two or more thereof. For example, the system executing the game can take a snapshot and make a copy of memory. One process to save may require game awareness. One process to save may require system driven logic and may generally be accomplished without game-specific handling, but the resulting stored state is typically much larger (data size) than the status managed by the game. Compression and encryption effects may be applied to the saved data, in some embodiments.

In yet another embodiment, the system is configured to stream gameplay to a mobile device of the user where graphic layers associated with the video stream are removed to generate a customized video stream based on the bandwidth and device type of the user. In this way, when playing games via a mobile device, users are provided with a customized video stream that is optimized for the user based on the capabilities of the device of the user and the available bandwidth.

With the above overview in mind, the following provides several example figures to facilitate understanding of the example embodiments.

FIG. 1 illustrates an embodiment of a system for interaction of a mobile game via a mobile device 102. As shown, a user 100 is shown physically located in a real-world space 108 playing a video game using the mobile device 102. In one embodiment, examples of a mobile device 102 may include a portable game player, a smart phone, a laptop computer, a notebook computer, a tablet computer, a book reader, a PDA, a mobile phone, a digital camera, a video camera, a sound recorder, etc. Further, the program executing in the mobile device 102 device does not have to be a game and can also be any other type of program that can be executed on the computing device. In some embodiments, the content can include other target classes of content, including interactive narratives, virtual reality experiences, augmented reality experiences, interactive livestreams, etc.

In the illustrated implementation, the mobile device 102 is wirelessly connected to a cloud computing and gaming system 106 over a network 104. In one embodiment, the cloud computing and gaming system 106 maintains and executes the video game played by the user 100. In some embodiments, the cloud computing and gaming system 106 is configured to receive inputs from the mobile device 102 over the network 104. The cloud computing and gaming system 106 is configured to process the inputs to affect the state of the executing video game. The output from the executing video game, such as video data, audio data is compressed and transmitted to the mobile device 102 for decoding. In other implementations, the mobile device 102 may communicate with the cloud computing and gaming system 106 wirelessly through alternative mechanisms or channels such as a cellular network.

Figure 2A:
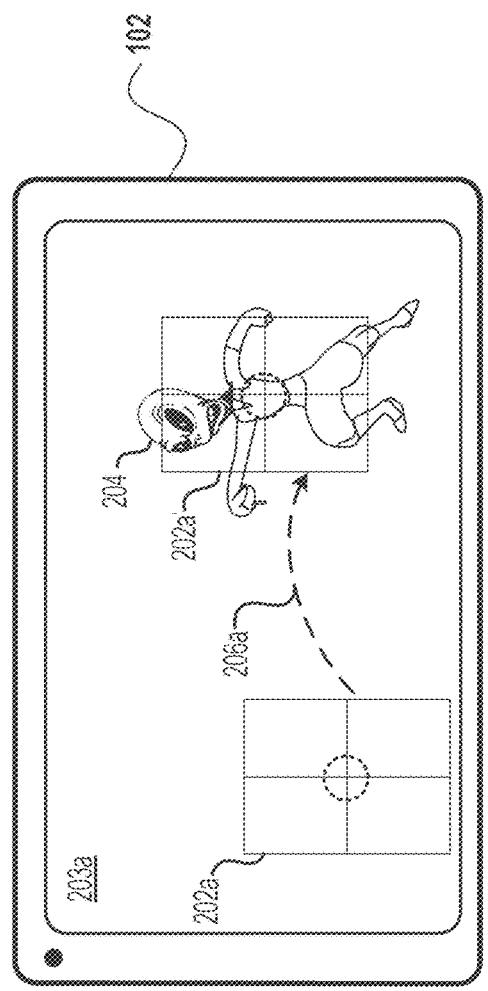
FIGS. 2A-2B illustrate an embodiment of a view of a display screen of a mobile device that includes various games played by a user, in accordance with implementations of the disclosure.
Figure 2B:
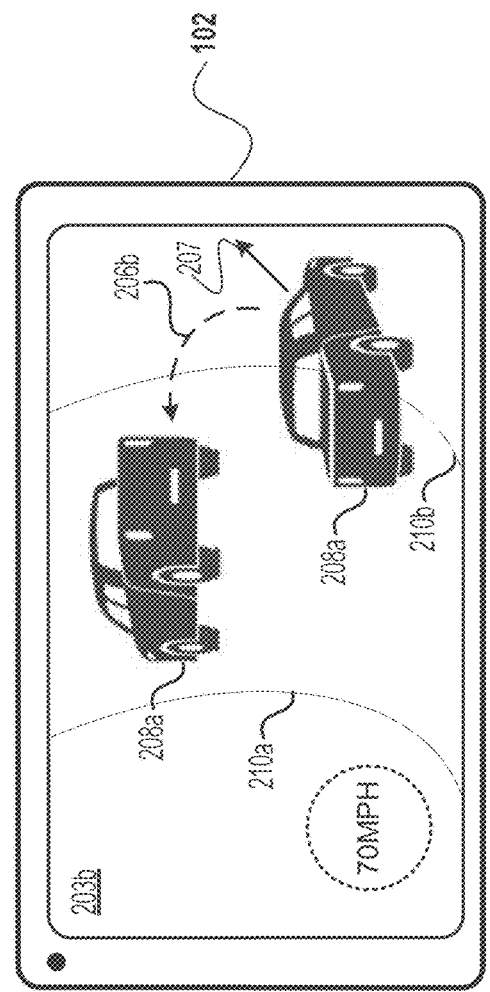

FIGS. 2A-2B illustrate an embodiment of a view of a display screen of a mobile device 102 that includes various games played by a user 100. As illustrated in FIG. 2A, display screen 203a illustrates a shooting game where the objective is to shoot and kill enemy characters in the game to advance onto the next stage. In one embodiment, as the user plays the game and provides controller input via the glass screen of the mobile device 102 to perform various game actions, the system is configured to process the controller input to determine a correction value 206a required to perform the intended game action. In some embodiments, after determining the correction value, the system is configured to apply the correction value 206a to the controller input to increase an accuracy of the controller input when performing the actions in the game (e.g., aiming and shooting enemy character). In this way, when the correction value 206a is applied to the controller input, the system can help the user accurately aim and shoot at the enemy character 204. In one embodiment, correction values can be calibrated to the specific user and/or mobile device, so different users and/or different devices could receive different correction amounts based on their playstyle and screen sensitivity.

In one embodiment, accuracy of input may also refers to how precisely the inputs are measured/sampled and processed. In other embodiments, accuracy of input may refer to the accuracy of the player character in the game world. In some configurations, the accuracy of input may include both how the inputs are measured/sampled and processed and how accuracy of the player character in the game world. In some embodiments, it might be advantageous to accept highly precise inputs and reflect those in the game, or it might be advantageous to actually ignore some of the available precision and algorithmically adjust gameplay to interpret the player's ultimate intent more easily.

For example, in the illustration shown in FIG. 2A, a user 100 (not shown) may provide controller input via the glass screen of the mobile device 102 in an attempt to aim at enemy character 204. However, after providing controller input and attempting to aim at the enemy character 204, the system may determine that the controller input results in target location 202a being directed at a distance away from the enemy character 204. As a result, the user is unable to correctly aim at the enemy character 204 since the target location 202a does not include the intended target (e.g., enemy character 204). As noted above, in one embodiment, the system may determine a correction value that is required to assist the user perform the game action of aiming at the enemy character 204. As further illustrated in FIG. 2A, in one embodiment, the system may determine a correction value 206a that is required to shift the target location 202a to its intended location (e.g., center of mass of enemy character 204). As shown, when the correction value 206a and applied to the controller input of the user, the target location 202a is shifted to the intended target location 202a' where the enemy character 204 is located. Accordingly, when the intended target location 202a' is directed toward the enemy character 204, the accuracy of shooting and killing the enemy character 204 is increased which can help the user 100 advance in the gameplay.

Referring to FIG. 2B, display screen 203b illustrates a racing game where the objective is to be the first car to cross the finish line. In one embodiment, as the user plays the game and provides controller input via the glass screen of the mobile device 102 to perform various game actions, e.g., driving the race car 208a at its optimal speed, maneuvering and controlling the race car 208a. As shown in FIG. 2B, the race car 208a is driving at a speed of 70 MPH and attempting to stay within boundary lines 210a-210b. However, after providing controller input and attempting to control the race car 208a so that it stays within boundary lines 210a-210b, the race car 208a crosses the boundary line 210b and veers in a direction 207 away from the boundary lines 210a-210b. In some embodiments, to help the user perform the game action of driving within the boundary lines 210a-210b and to help the user regain its control and direct the race car 208a along the boundary lines 210a-210b, the system is configured to determine a correction value 206b that is required to shift the race car toward the boundary lines 210a-210b. As shown, when the correction value 206b and applied to the controller input of the user, the race car 208a is guided in a direction along the boundary lines 201a-210b so that the race car 208a does not continue veering in a direction off-course. Accordingly, when the correction value 206b is applied to the controller input, this may help user with controlling and maneuvering the race car 208a so that it stays within the boundary lines 210a-210b.

Figure 3:
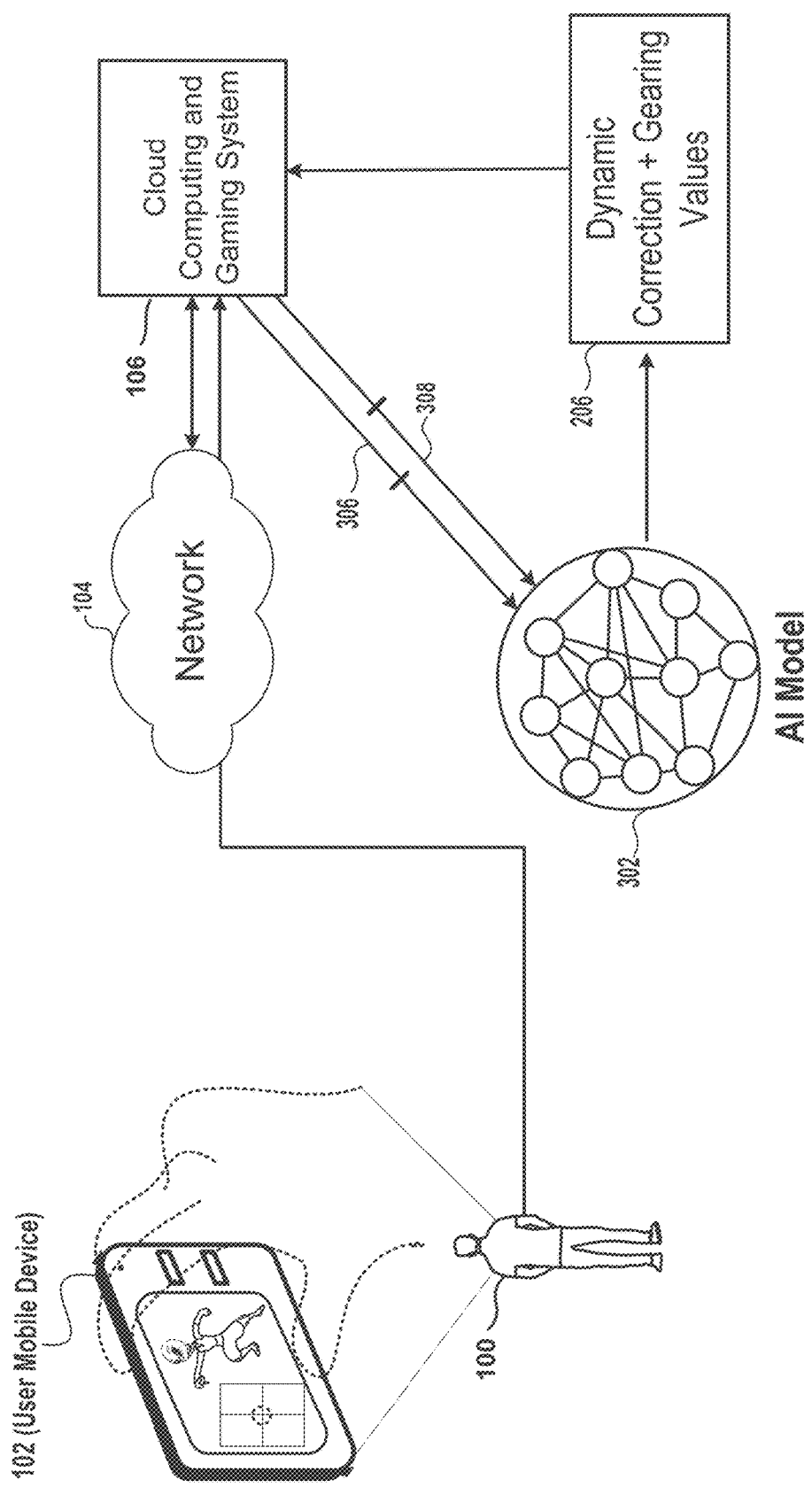
FIG. 3 illustrates an embodiment of a system generating real-time dynamic correction and gearing values for gameplay of a user, in accordance with implementations of the disclosure.

FIG. 3 illustrates an embodiment of a system generating real-time dynamic correction and gearing values for gameplay of a user 100. The figure shows a method for generating real-time dynamic correction and gearing values 206 using an Artificial Intelligence (AI) model 302 for a game during a session. In some embodiments, the AI model 302 may further use controller input data 306 and interactive data 308 as inputs to generate the correction and gearing values 206. In one embodiment, during a gameplay session of a user 100, a plurality of controller input data 306 is captured from a mobile device 102 of the user and transmitted over the network 104 and received by the cloud computing and gaming system 106 for processing.

The method then flows to AI model 302 which is configured to receive as inputs the controller input data 306 and interactive data 308. In one embodiment, the interactive data 308 may also include game state data that is presented in the game while the user 100 is playing the game. The interactive data 308 can provide the AI model 302 with the context of the gameplay, the current state of the gameplay, and the upcoming scenes of the gameplay. In some embodiments, other inputs that are not direct inputs may also be taken as inputs to the AI model 302. In one example, other inputs such as games played via a game controller of a gaming console or PC can be received by the AI model 302. In one embodiment, the AI model 302 can learn what the game controller inputs of a gaming console or PC is desired or intended by the user 100. In one embodiment, the game controller inputs of a gaming console, the controller input data 306 from the mobile device, and the interactive data 308, can be used as inputs to the AI model 302 where the model is configured to learn what the user 100 intended based on based on corrections the user makes when providing controller inputs (e.g., via game controller or via mobile phone) to achieve a goal in the game or to perform certain actions in the game. Accordingly, using the noted inputs, the AI model 302 can be generated for the user 100 and the AI model 302 can be used to determine the correction and gearing values 206.

In some embodiments, the correction and gearing values 206 are associated with gearing metrics. In one embodiment, the gearing metrics can identify a rate at which the correction value is applied such as a magnitude and a direction. For example, the gearing metrics may include a magnitude and a direction. For example, referring to FIG. 2A, the system may determine that correction value 206a has an associated gearing metric that identifies a magnitude of '5 units' and direction of '35 degrees' that is applied to the controller input in order to move target location 202a to the intended target location 202a'. In another example, referring to FIG. 2B, the system may determine that correction value 206b has an associated gearing metric that identifies a magnitude of '10 units' and direction of '130 degrees' that is applied to the controller input in order to shift the race car on course within the boundary lines 210a-210b. In other embodiments, the gearing metrics identify a rate at which the correction value is applied such as a velocity that identifies how fast or slow the controller input performs the action in the game. In some embodiments, the correction and gearing values 206 are applied to the controller input and continuously updated in substantial-real time during the gameplay of the user to increase the accuracy of the controller input when performing the action.

In one example, when the user 100 is using the glass screen of the mobile device 102, the AI model 302 can be used to dynamically auto-correct or adjust the gearing to make the gameplay via the mobile device 102 equivalent to what the user is used to seeing when playing with the game controller of a gaming console or PC. In some embodiments, as the AI model 302 continues to learn and receive additional inputs, the AI model 302 and can continuously modify and refine the adjustments to further increase an accuracy of the controller input when performing the action.

In some embodiments, the AI model 302 may also use a machine learning model that is used to predict the correction and gearing values 206 to apply to the controller input of the user to help the user increase an accuracy of the controller input when performing an action in the game. In one embodiment, the AI model 302 may also be used to identify patterns, similarities, and relationships between the game controller inputs of a gaming console, the controller input data 306 from the mobile device, and the interactive data 308. Using the patterns, similarities, and relationships, the AI model 302 may be used to generate the correction and gearing values 206 which may be beneficial to the user for progressing through the game (e.g., automatic aim assist, automatic drive control assist, etc.).

Referring to the example shown in FIG. 3, user 100 is shown playing a shooting game via a mobile device 102 where the user 100 is attempting to aim and shoot at an enemy character. Using the controller input data 306 from the mobile device, and the interactive data 308, the AI model 302 can understand the context of the game scene and determine that the user 100 is attempting to aim at the enemy character, however, the target location is not positioned at the intended target location (e.g., enemy character). Accordingly, to assist the user 100 perform the action in the game, the AI model 302 can be used to identify the correction and gearing values 206. After identifying the correction and gearing values 206, the method further includes transmitting the correction and gearing values 206 to the cloud computing and gaming system 106 over the network 104. In one embodiment, after receiving the correction and gearing values 206, cloud computing and gaming system 106 can apply the correction and gearing values 206 to the controller input in real-time while the user is playing the game to assist the user with aiming at the enemy character.

Figure 4:
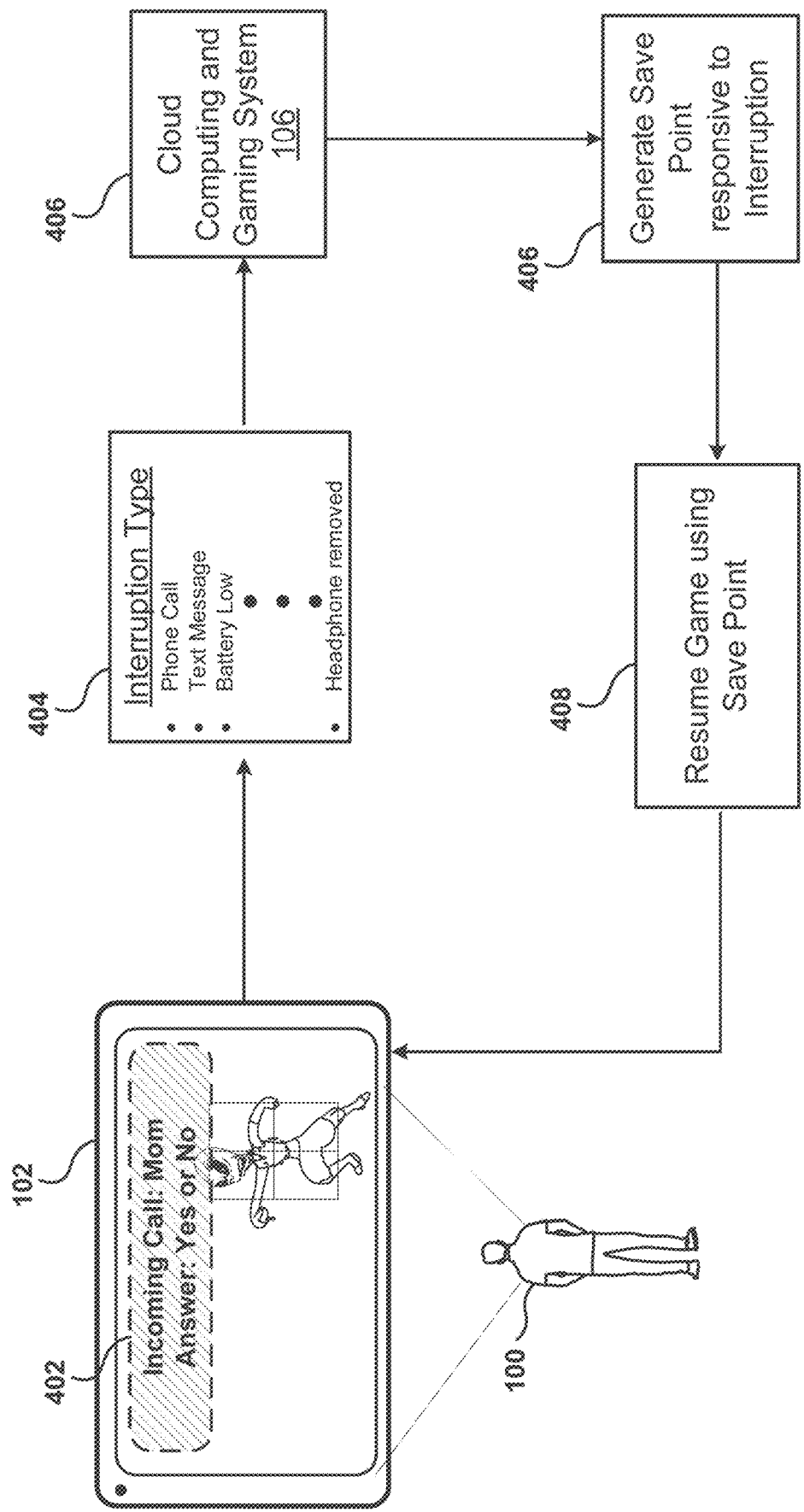
FIG. 4 is an embodiment of a system for processing and handling interruptions during gameplay of a user and automatically generating a save point which can be used to resume the gameplay, in accordance with implementations of the disclosure.

FIG. 4 is an embodiment of a system for processing and handling interruptions during gameplay of a user 100 and automatically generating a save point which can be used to resume the gameplay. In one embodiment, as illustrated in FIG. 4, the system is configured to monitor gameplay of the user 100 while playing a game via a mobile device 102. During the gameplay of the user 100, the gameplay may be interrupted by various interruptions which may interfere with the gameplay of the user. As a result, in some embodiments, the system is configured monitor the gameplay of the user and to detect the interruptions of the gameplay. For example, as shown on the display screen of the mobile device 102, while the user interacts with the game via the mobile device 102 (or another device), the user may determine that a phone call is interrupting the gameplay. In some embodiments, in response to the phone call, the system is configured to generate an interruption notification 402 (e.g., incoming call: Mom) which can be displayed and presented to the user via the display screen of the mobile device 102. In one embodiment, the interruption notification 402 may prompt the user to answer the call or to reject the call.

The method then flows to operation 404 which is configured to identify a type of the interruption. In some embodiments, the system is configured to identify and distinguish between the type of interruptions that may interfere with the gameplay of the user 100. In some embodiments, each of the interruptions may include metadata that identifies the type of interruption. In one embodiment, the metadata may include information that describes the type of interruption such as a phone call, text message, push notifications from applications, social media notification; low-battery life warning, battery dead, user exited the game, headphone removal, etc. For example, a user may be located in their dorm room and wearing headphones while playing a game via a mobile device. When the user removes their headphones to speak with their roommate, the gameplay may be interrupted and may be automatically and temporarily paused to allow the user to speak to the roommate. Using the interruptions types, the system can use the history of interruptions as an input to generate a save point to resume the game.

In another embodiment, a blacklist/whitelist may be used to allow calls or messages only from a select list of people, i.e. "allow interruptions from mom but not from uncle Joe." In one configuration, the list could be automatically generated based on past behavior. The past behavior would be used by the system to model and learn that: "He/She usually stops playing and answers when mom calls, but not when uncle Joe calls." The system could then preemptively save based on expectation that the player will answer mom's call.

The method then flows to operation 406 where the cloud computing and gaming system 106 is configured to process the interruption type to generate a save point in the background in response to the type of interruption. In one embodiment, the save point is automatically generated at a time before the interruption occurs to allow an overlap when the save point is used to resume the game. In other embodiments, the time before the interruption is selected based on the type of interruption. In one example, if the interruption is a phone call, the save point is generated at a point approximately two seconds before the gameplay is interrupted by the phone call. In another example, if the interruption is because the battery of the mobile device has died, the save point is generated at a point approximately ten seconds before the battery died. As a result, when the user uses the save point to resume the gameplay, the user may have a period of overlap to allow the user to refresh their memory so that the user can remember where they previously left off in the gameplay. In some embodiments, when the system detects an interruption of the gameplay, the interruption is delayed by a period of time to enable the system to generate the save point. For example, during the gameplay of the user, when the system detects an incoming text message, the text message notification is buffered for a period of time before presenting the text message notification on the display screen of the mobile device 102.

In yet another embodiment, other techniques may be used other than save points. For example, if the game play were an online multiplayer game, a save point may not be easily used. To address this issue, it is possible to make the user's character temporarily immovable and invincible, with some visual indication that the user is away from the game. One example way of providing a visual indication is to make the game character transparent, or putting a colored glow around it or near the user's character. This configuration would provide a benefit in that the character would be prevented from being killed while the user's attention is elsewhere, and everyone else would understand why the character suddenly stopped playing/moving.

In other embodiments, operation 406 is configured to use an AI model that is configured to receive as inputs the interruption type and interactive data associated with the gameplay to predict a time before an interruption occurs to generate the save point. In one embodiment, the interactive data may also include game state data that is presented in the game while the user 100 is playing the game. The interactive data can provide the AI model with the context of the gameplay, the current state of the gameplay, and the upcoming scenes of the gameplay. Based on learning of the interruption types, the AI model can be used to determine a point before the interruption to generate the same point so that the user can resume the gameplay.

The method then flows to operation 408 where the generated save point is used to resume the gameplay. In one embodiment, the save point can be used to resume the gameplay on the mobile device or other devices such as a gaming console, PC, tablet, etc. The save point can be shared with other users so that the other users can experience playing the game at the approximate point where the game was interrupted. For example, the user 100 may be interrupted at a point in a game scene where the user is fighting a boss character. After the save point is generated, the user 100 can share the save point with a friend of the user so that the friend can experience playing the game that includes the boss character.

Figure 5:
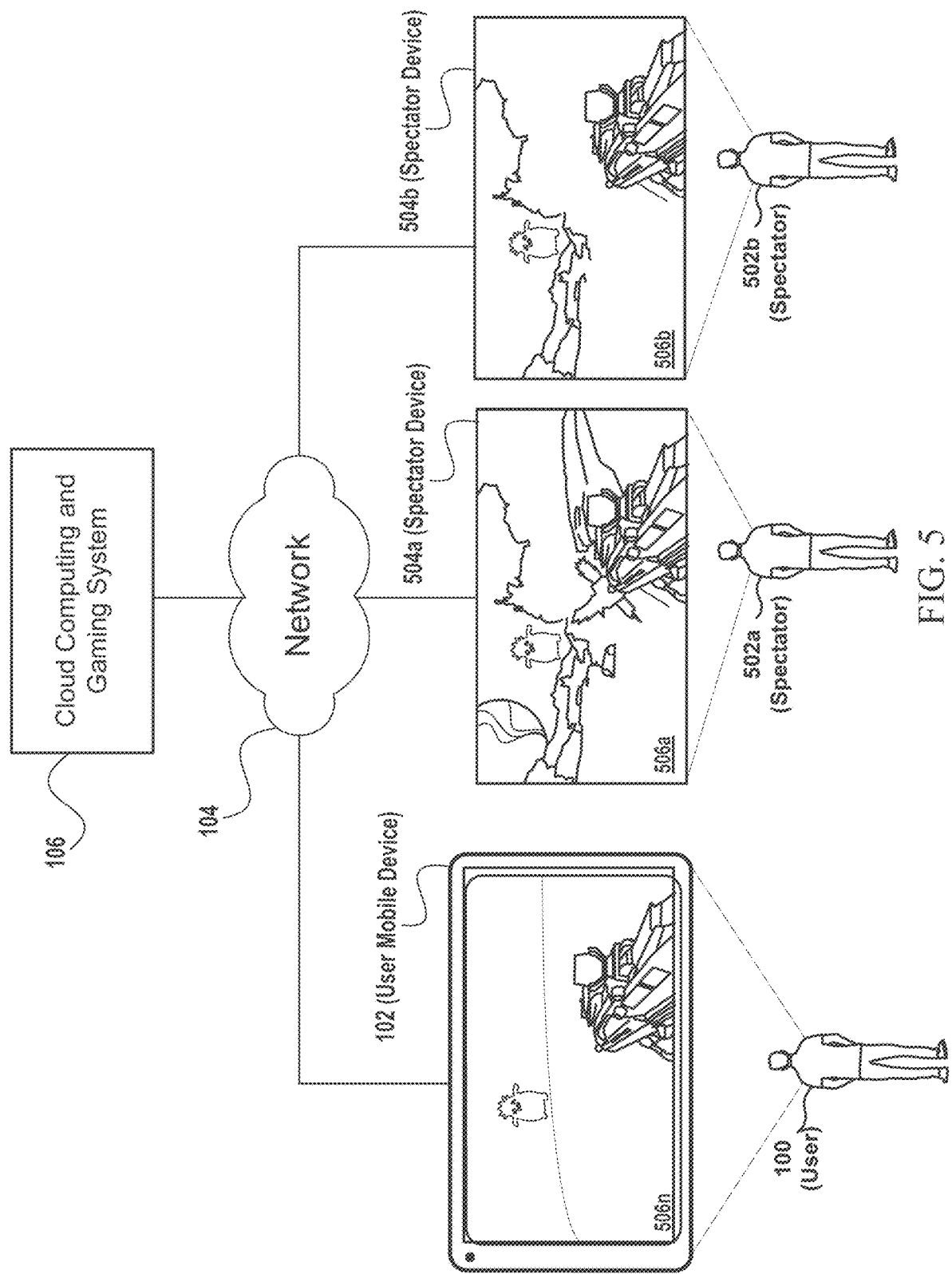
FIG. 5 is an embodiment of a system for streaming gameplay to a user device and spectator devices from a cloud gaming system where the video streams transmitted to the user device and the spectator devices are customized for each respective user device and spectator device, in accordance with implementations of the disclosure.

FIG. 5 is an embodiment of a system for streaming gameplay to a user device 102 and spectator devices 504a-504b from a cloud gaming system 106 where the video streams transmitted to the user device and the spectator devices are customized for each respective user device and spectator device. As shown in FIG. 5, a user 100 and spectators 502a-502b are coupled to and can communicate with the cloud computing and gaming system 106 through the network 104. In one embodiment, the user 100 is shown playing a game via a mobile device 102 and can be configured to send game commands via controller input to the cloud computing and gaming system 106. As further illustrated, the spectators 502a-502b can be coupled to and can communicate with the cloud computing and gaming system 106. Broadly speaking, the network 104 may include local or remote networks, including the Internet.

In some embodiments, the user 100 and spectators 502a-502b can be configured to receive encoded video streams and decode the video streams received by the cloud computing and gaming system 106. The encoded video streams, for example, are provided by the cloud computing and gaming system 106, while user devices (or spectator devices) provide inputs for interacting with the game. In some embodiments, the video streams may be presented to the user 100 and the spectators 502a-502b on a display and/or a separate device such as a monitor or television. In some embodiments, the devices of the user and spectators can be any connected device having a screen and internet connections.

In some embodiments, the cloud computing and gaming system 106 is configured to identify a device of the user 100 playing the game and a device of a spectator viewing (or playing) the game. In some embodiments, the device of the user 100 and spectators 502a-502b can be any general or special purpose device known in the art, including but not limited to, a mobile device, a cellular phone, a gaming console, a personal computer, a laptop, a tablet computer, a tablet, a thin client, a set-top box, a media streaming device, etc. In one example, referring to FIG. 5, the user 100 is shown playing a game via a mobile device 102. In addition, spectators 502a-502b are shown viewing the game via their respective spectator devices 504a-504b (e.g., gaming console, PC, etc.).

In one embodiment, the cloud computing and gaming system 106 is configured to identify a bandwidth associated with the mobile device 102 of the user 100 while the user plays the game. In other embodiments, the cloud computing and gaming system 106 is configured to identify a bandwidth associated with the spectator devices 504a-504b while the spectators 502a-502b view the game. In one embodiment, the bandwidth describes the maximum data transfer rate of the communication channel between the cloud computing and gaming system 106 and the user and spectator devices.

In some embodiments, the cloud computing and gaming system 106 is configured to generate a video steam for transmission to the mobile device 102 of a user 100 and to the spectator devices of the spectators 502a-502b. In some embodiments, each video stream generated for transmission to the devices of the user and spectators can be customized based on the identified bandwidth. In one example, the cloud computing and gaming system 106 is configured to generate a video stream for transmission to the mobile device 102 of the user 100 where one or more graphic layers of the video stream is removed based on the bandwidth associated with the mobile device 102 of the user 100 while the user plays the video game. In another example, the cloud computing and gaming system 106 is configured to generate video streams for transmission to the spectator devices 504a-504b of the spectators 502a-502b where graphic layers of each respective stream are removed based on the bandwidth associated with the spectator devices 504a-504b.

Referring to FIG. 5, the display screens (e.g., 506a, 506b, 506n) of the respective devices illustrate three customized video streams that are generated by the cloud computing and gaming system 106 for display to the user 100 and the spectators 502a-502b via their respective devices. In one example, the video stream shown on display screen 506a has a greater number of graphic layers (e.g., higher density, greater level of detail in the foreground and background, greater number of graphic objects, greater number of user interface elements, etc.) compared to display screen 506b and 506n since the bandwidth associated spectator device 504a is greater than the bandwidth associated with spectator device 504b and mobile device 102. As shown on the display screen 506*a*, the game scene includes a greater level of detail in its background compared to the game scenes shown on display screen 506*b* and 506*n*.

In another example, the video stream shown on display screen 506*b* has a greater number of graphic layers (e.g., higher density and greater level of detail) compared to display screen display screen 506*n* since the bandwidth associated spectator device 504*b* is greater than the bandwidth associated with mobile device 102. In one embodiment, since the mobile device 102 has a reduced bandwidth and is lower than the bandwidth of the spectator devices, the content that is displayed on the display screen 506*n* is minimal and does not include the same level of background detail as shown on display screens 506*a*-506*b*.

In some embodiments, when the bandwidth associated with the device of the user 100 and the spectators 502*a*-502*b* falls below a specified threshold value, the cloud computing and gaming system 106 is configured to remove one or more graphic layers of the video stream for the corresponding user 100 and the spectators 502*a*-502*b*. For example, the further the bandwidth falls below the threshold value, the greater the number of graphic layers of the video stream is removed.

In other embodiments, the cloud computing and gaming system 106 may assemble and rearrange the graphic layers of the video stream based on the particular device and its corresponding orientation (e.g., landscape vs. portrait) so that the video stream is optimized for viewing by the user and the spectators. For example, based on the orientation of the device, some user interface elements (e.g., scores, inputs, maps, help, etc.) can be rearranged placed at different locations to provide the users and spectators with the most optimal view of the interface elements. In some embodiments, the cloud computing and gaming system 106 may remove or reduce the graphic objects, the user interface elements, and any graphic layers so that the heaviness and density of the frames of the video stream are reduced. For example, in some cases, the graphic layers can be omitted if not important, or arranged in different locations. Accordingly, in some embodiments, the cloud computing and gaming system 106 is configured to generate a customized video stream for each user and spectator based on the bandwidth, screen content configuration, and the particular devices that that are using.

In another embodiment, each user may be getting a customized set of composited layers from the cloud gaming server. This information may include selection based on bandwidth, or screen. In still other embodiments, information such as physical location or profile of the user themselves can be provided. For example, imagine an audience platform that segments cohorts of viewers by profile such as genres of games played, hours played per week, number of friends, locale, etc and associates their engagement on viewing streams based on small transforms being applied to only a percentage of that audience. The transforms could be of the types described here (e.g., level of detail, layout, stats, etc.) or more subtle things like color, texture, lighting, sound cues, or haptic features. The algorithm could optimize which graphical layers are rendered or transformed and composited based on these outcomes depending on the audience.

Figure 6:
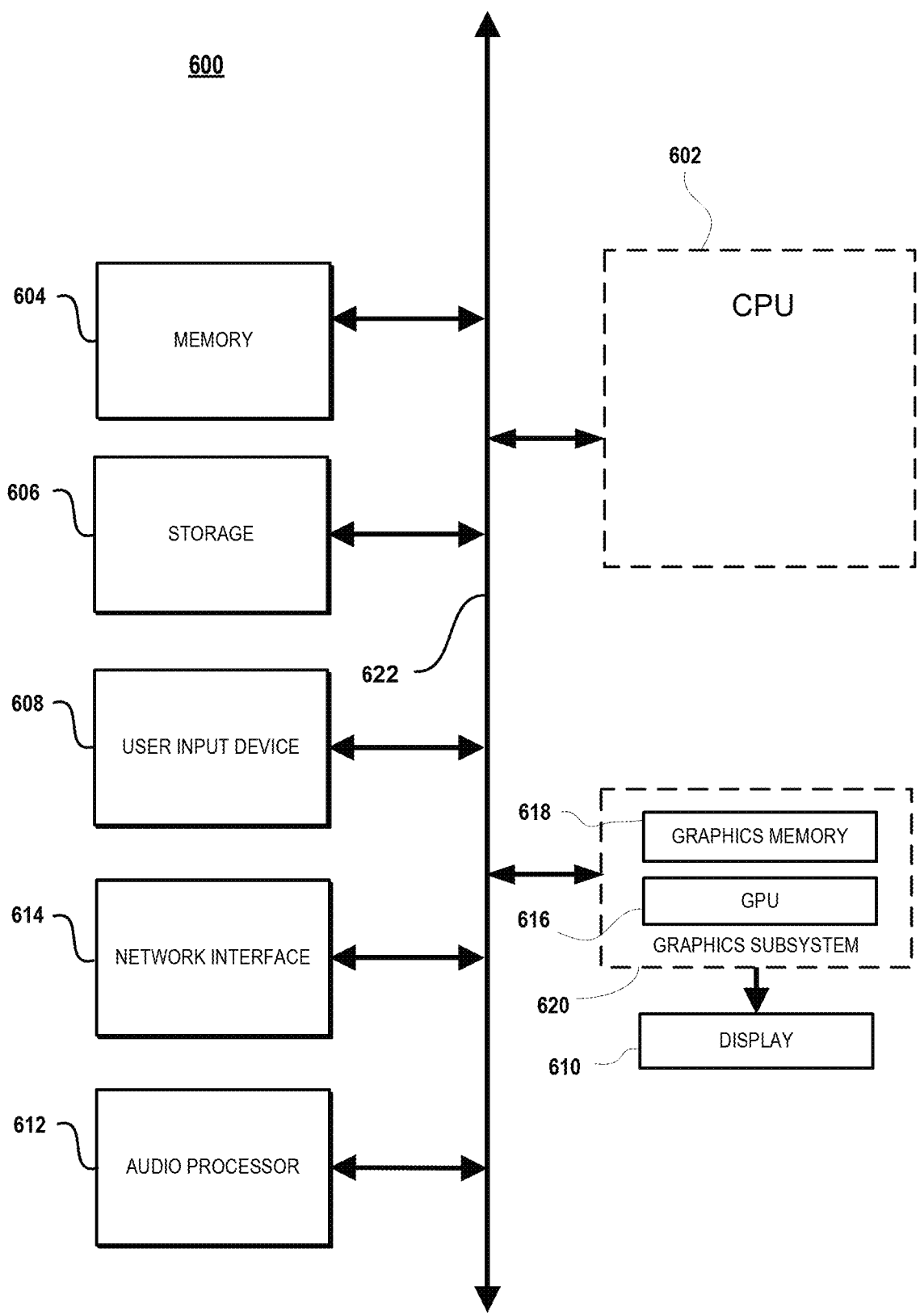
FIG. 6 illustrates components of an example device that can be used to perform aspects of the various embodiments of the present disclosure.

FIG. 6 illustrates components of an example device 600 that can be used to perform aspects of the various embodiments of the present disclosure. This block diagram illustrates a device 600 that can incorporate or can be a personal computer, video game console, personal digital assistant, a server or other digital device, suitable for practicing an embodiment of the disclosure. Device 600 includes a central processing unit (CPU) 602 for running software applications and optionally an operating system. CPU 602 may be comprised of one or more homogeneous or heterogeneous processing cores. For example, CPU 602 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 600 may be a localized to a player playing a game segment (e.g., game console), or remote from the player (e.g., back-end server processor), or one of many servers using virtualization in a game cloud system for remote streaming of gameplay to clients.

Memory 604 stores applications and data for use by the CPU 602. Storage 606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 608 communicate user inputs from one or more users to device 600, examples of which may include keyboards, mice, joysticks, touch pads, touch screens, still or video recorders/cameras, tracking devices for recognizing gestures, and/or microphones. Network interface 614 allows device 600 to communicate with other computer systems via an electronic communications network, and may include wired or wireless communication over local area networks and wide area networks such as the internet. An audio processor 612 is adapted to generate analog or digital audio output from instructions and/or data provided by the CPU 602, memory 604, and/or storage 606. The components of device 600, including CPU 602, memory 604, data storage 606, user input devices 608, network interface 610, and audio processor 612 are connected via one or more data buses 622.

A graphics subsystem 620 is further connected with data bus 622 and the components of the device 600. The graphics subsystem 620 includes a graphics processing unit (GPU) 616 and graphics memory 618. Graphics memory 618 includes a display memory (e.g., a frame buffer) used for storing pixel data for each pixel of an output image. Graphics memory 618 can be integrated in the same device as GPU 608, connected as a separate device with GPU 616, and/or implemented within memory 604. Pixel data can be provided to graphics memory 618 directly from the CPU 602. Alternatively, CPU 602 provides the GPU 616 with data and/or instructions defining the desired output images, from which the GPU 616 generates the pixel data of one or more output images. The data and/or instructions defining the desired output images can be stored in memory 604 and/or graphics memory 618. In an embodiment, the GPU 616 includes 3D rendering capabilities for generating pixel data for output images from instructions and data defining the geometry, lighting, shading, texturing, motion, and/or camera parameters for a scene. The GPU 616 can further include one or more programmable execution units capable of executing shader programs.

The graphics subsystem 614 periodically outputs pixel data for an image from graphics memory 618 to be displayed on display device 610. Display device 610 can be any device capable of displaying visual information in response to a signal from the device 600, including CRT, LCD, plasma, and OLED displays. Device 600 can provide the display device 610 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A computer-implemented method for streaming gameplay to user devices from a cloud gaming system, the cloud gaming system including a server for enabling multiplayer gaming, comprising:
    identifying a first device of a first user for playing a multiplayer game;
    identifying a second device of a second user for playing the multiplayer game;
    identifying a bandwidth associated with the first device and associated with the second device;
    removing graphic layers to be included in a scene of a video stream sent to one or both of the first and second devices, wherein a level of said bandwidth identified is used to identify a level of said removing of graphic layers;
    wherein said scene viewable via the first and second devices remains playable with more or less graphic layers being removed.

2. The computer-implemented method of claim 1, wherein said removing of graphic layers of the video stream is based on the bandwidth falling below a threshold value.

3. The computer-implemented method of claim 1, wherein said removing of graphic layers of the video stream causes a reduction in graphic objects to be displayed on a screen associated with said first or second devices.

4. The computer-implemented method of claim 1, wherein said removing of graphic layers of the video stream causes a reduction in user interface elements to be displayed on a screen associated with said first or second devices.

5. The computer-implemented method of claim 1, wherein said removing of graphic layers of the video stream is based on a processing power of the first and second devices.

6. The computer-implemented method of claim 1, further comprising:
    Rearranging the graphic layers based on an orientation of the first or second devices to optimize a view of the scene.

7. The computer-implemented method of claim 1, wherein one of the first or second devices is associated with a spectator of the multiplayer game.

8. The computer-implemented method of claim 1, further comprising,
    one or more additional devices of players or spectators of the multiplayer game; and dynamically removing graphic layers of the video stream as provided to the respective players or spectators based on their detected respective bandwidth.

\* \* \* \* \*